(No Model.)
W. H. DAYTON.
MACHINE FOR GROOVING SEWING MACHINE NEEDLES.
No. 245,356. Patented Aug. 9, 1881.
Fig. 1.
Fig. 3.
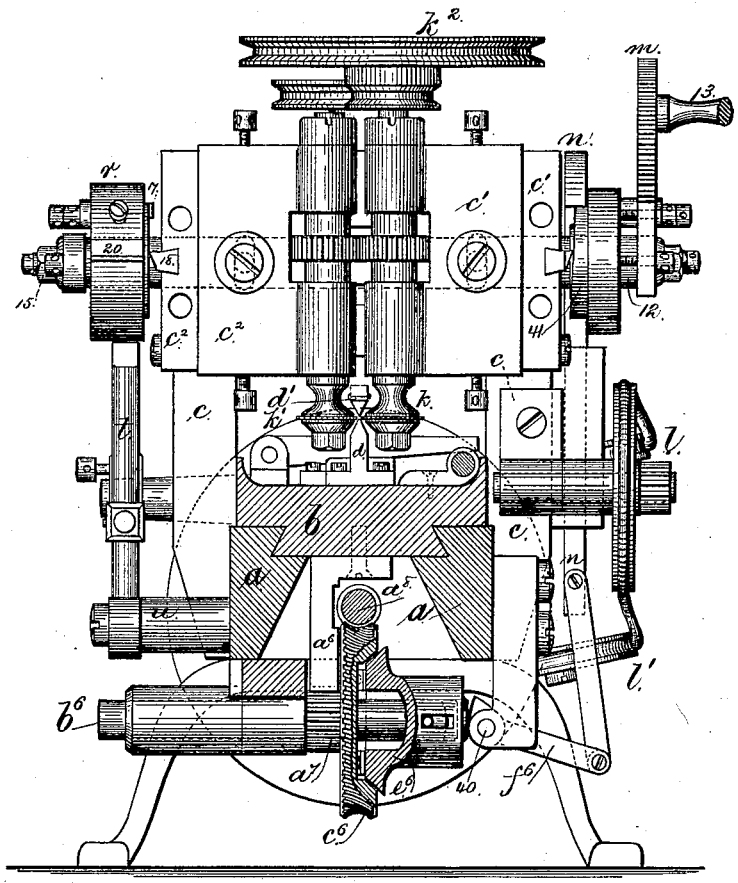
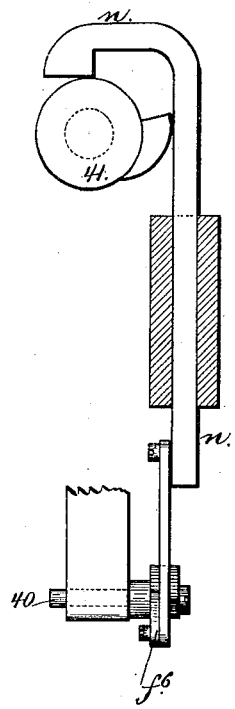
Fig. 2.
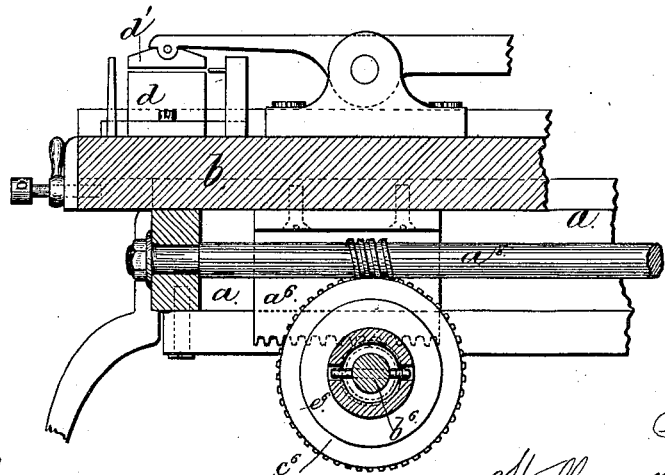
Witnesses
Harold Serrell
Chas H Smith
J. Staib
Inventor
per William H Dayton
Lemuel W Serrell
Atty

UNITED STATES PATENT OFFICE.

WILLIAM H. DAYTON, OF TORRINGTON, CONNECTICUT, ASSIGNOR TO THE EXCELSIOR NEEDLE COMPANY, OF SAME PLACE.

MACHINE FOR GROOVING SEWING-MACHINE NEEDLES.

SPECIFICATION forming part of Letters Patent No. 245,356, dated August 9, 1881.

Application filed May 2, 1881. (No model.)

*To all whom it may concern:*

Be it known that I, WILLIAM H. DAYTON, of Torrington, in the county of Litchfield and State of Connecticut, have invented an Improvement in Machines for Grooving Sewing-Machine Needles, of which the following is a specification.

Letters Patent No. 184,347 were granted November 14, 1876, for machines for grooving sewing-machine needles to Excelsior Needle Company, as assignees of James Alldis and myself. In that machine the bed was moved along by the action of a screw, and there was a half-nut that was brought into contact with the screw by the action of a cam against a hook and sliding rod, $n$.

I have lettered the parts in the present drawings the same as the corresponding parts in the aforesaid patent, and hereby make a reference thereto in order that the character of my present improvement may be more fully understood.

In using the aforesaid patented machines difficulties have arisen from the movement of the half-nut and bed. The screw revolves continuously, and if the half-nut is raised at a time when the screw is in such a position that the threads of the nut do not correspond to the threads of the screw, the inclined faces of the threads give to the half-nut a sudden movement one way or the other, and the bed is also started suddenly at the risk of breaking the teeth of the revolving cutter. Besides this, the screw does not always enter the threads of the nut properly, and there is considerable wear both on the screw and on the half-nut, rendering it necessary to replace them frequently.

My present invention is made for the purpose of preventing injury to the teeth of the cutters. I accomplish this by starting the bed gradually and by friction, so that the frictional device will slip if there is too great strain on the cutter-teeth, and so that there will not be unnecessary wear upon the parts, thus rendering the machine more durable and avoiding the risk of injury to the parts.

In the drawings, Figure 1 is an end view of the machine with the bed in section. Fig. 2 is a partial longitudinal section of the bed, and Fig. 3 shows the cam and sliding rod separately. Except in the parts hereinafter described, Fig. 1 corresponds to Fig. 2 of aforesaid patent.

The bed $b$, which slides in the frame $a$, instead of being moved endwise by a screw, is provided with a rack, $a^6$, on its under side; and $a^7$ is a pinion on the shaft $b^6$; and $c^6$ is a worm-wheel that is loose upon the shaft $b^6$, which wheel is revolved continuously by the shaft and worm $a^8$.

Adjacent to the worm-wheel $c^6$ is a friction-wheel, $e^6$, that can be moved endwise upon the shaft $b^6$, into or out of contact with $c^6$; and $f^6$ is a lever upon the fulcrum 40, the inner end of which is made as a cam, and the outer end is connected by a link to the sliding bar $n$; and 41 is the cam by which the bar $n$ is raised at the proper time to move the lever $f^6$, and by its cam slide the wheel $e^6$ into contact with the worm-wheel $c^6$, and thereby cause said wheel $c^6$ to impart to the shaft $b^6$ and pinion $a^7$ a rotary movement to slide the bed $b$ endwise with a gradual motion, and thereby cause the grooving of the needle from the shank toward the point, as said needle is clamped between the jaws $d$ and $d'$ and acted upon by the revolving cutter $k'$, as in aforesaid patent. When the cam 41 is not acting upon the hooked bar $n$ the friction-wheel is separated from the worm-wheel by springs that are between them, and the bed can be moved endwise by hand for taking out or placing in a needle-blank; and it is found that the aforesaid means for moving the bed act so gradually and reliably that the cutters are not injured and the grooving is more perfect and uniform.

I claim as my invention—

The combination, in a machine for grooving needles, of clamps for holding the needle, rotary grooving-tools, a bed for the needle-clamps, a supporting-frame, a continuously-revolving wheel, $c^6$, an adjacent friction-wheel, a rack and pinion, a shaft that is revolved by the friction-wheel, and mechanism, substantially as set forth, for bringing the friction-wheel into action when the bed is to be moved endwise, as set forth.

Signed by me this 23d day of April, A. D. 1881.

WILLIAM H. DAYTON.

Witnesses:
ELIJAH MUNGER,
JOHN W. BROOKS.